United States Patent
Nakajima

(10) Patent No.: US 12,058,670 B2
(45) Date of Patent: Aug. 6, 2024

(54) COMMUNICATION APPARATUS AND CONTROL METHOD THEREFOR

(71) Applicant: CANON KABUSHIKI KAISHA, Tokyo (JP)

(72) Inventor: Takafumi Nakajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 299 days.

(21) Appl. No.: 17/465,886

(22) Filed: Sep. 3, 2021

(65) Prior Publication Data

US 2021/0400691 A1  Dec. 23, 2021

Related U.S. Application Data

(63) Continuation of application No. PCT/JP2020/005840, filed on Feb. 14, 2020.

(30) Foreign Application Priority Data

Mar. 27, 2019 (JP) ................... 2019-061359

(51) Int. Cl.
  *H04W 72/12* (2023.01)
  *H04W 72/044* (2023.01)
  (Continued)

(52) U.S. Cl.
  CPC ..... *H04W 72/1263* (2013.01); *H04W 72/046* (2013.01); *H04W 76/14* (2018.02);
  (Continued)

(58) Field of Classification Search
  CPC ..... H04W 72/12; H04W 72/04; H04W 76/14; H04W 76/15; H04W 84/12; H04W 84/20;
  (Continued)

(56) References Cited

U.S. PATENT DOCUMENTS 10,104,664 B2 * 10/2018 Liu .................. H04W 72/0453
10,638,511 B2 *  4/2020 Kim ..................... H04W 84/12
(Continued)

FOREIGN PATENT DOCUMENTS

EP           3451782 A1    3/2019
JP        2017-225091 A   12/2017

OTHER PUBLICATIONS

International Search Report issued by the Japan Patent Office on May 12, 2020 in corresponding International Application No. PCT/JP2020/005840, with English translation.
(Continued)

*Primary Examiner* — Man U Phan
(74) *Attorney, Agent, or Firm* — Carter, DeLuca & Farrell LLP

(57) ABSTRACT

A communication apparatus operable in both a base station mode and a terminal mode, determines whether spatial reuse communication is usable in a first wireless network to be connected in the terminal mode; and decides, based on determination that the spatial reuse communication is usable in the first wireless network, to disable a function concerning the spatial reuse communication in a second wireless network established in the base station mode.

12 Claims, 8 Drawing Sheets

(51) Int. Cl.
*H04W 72/1263* (2023.01)
*H04W 76/14* (2018.01)
*H04W 84/12* (2009.01)
*H04W 88/06* (2009.01)
*H04W 88/10* (2009.01)

(52) U.S. Cl.
CPC ............ *H04W 84/12* (2013.01); *H04W 88/06* (2013.01); *H04W 88/10* (2013.01)

(58) Field of Classification Search
CPC ..... H04W 88/04; H04W 88/12; H04W 88/06; H04W 88/10; H04W 16/06; H04L 1/00; H04L 5/00; H04L 1/16; H04L 12/28; H04L 27/26; G06F 3/12
USPC .......................................................... 370/329
See application file for complete search history.

(56) References Cited

U.S. PATENT DOCUMENTS

| | | | | |
|---|---|---|---|---|
| 10,873,973 B2 * | 12/2020 | Ko | ........................ | H04W 88/08 |
| 11,483,865 B2 * | 10/2022 | Ko | ........................ | H04W 88/08 |
| 11,503,636 B2 * | 11/2022 | Ko | ........................ | H04W 88/08 |
| 11,659,581 B2 * | 5/2023 | Wang | ................... | H04W 72/046 |
| | | | | 370/329 |
| 11,711,183 B2 * | 7/2023 | Cherian | ................ | H04L 5/0007 |
| | | | | 370/330 |
| 2014/0056209 A1 * | 2/2014 | Park | ....................... | H04W 16/26 |
| | | | | 370/315 |
| 2014/0376453 A1 | 12/2014 | Smith | | |
| 2017/0255659 A1 | 9/2017 | Cariou | | |
| 2018/0376467 A1 * | 12/2018 | Patil | ...................... | H04B 7/063 |
| 2019/0069283 A1 | 2/2019 | Kim et al. | | |
| 2020/0106579 A1 * | 4/2020 | Cherian | ................ | H04B 17/318 |
| 2021/0185751 A1 | 6/2021 | Nakajima | | |
| 2021/0399830 A1 * | 12/2021 | Nakajima | ............ | H04W 76/10 |
| 2023/0042279 A1 * | 2/2023 | Ko | ........................ | H04W 84/12 |
| 2023/0262488 A1 * | 8/2023 | Kim | ...................... | H04L 1/1642 |
| | | | | 370/329 |

OTHER PUBLICATIONS

Notice of Reasons for Refusal issued by the Japanese Patent Office on May 27, 2024 in corresponding JP Patent Application No. 2023-093302, with English translation.

Smith, G. et al., "Dynamic OBSS_PD level" IEEE P802.11 / 18/0617r0 (Mar. 2018) pp. 1-4.

* cited by examiner

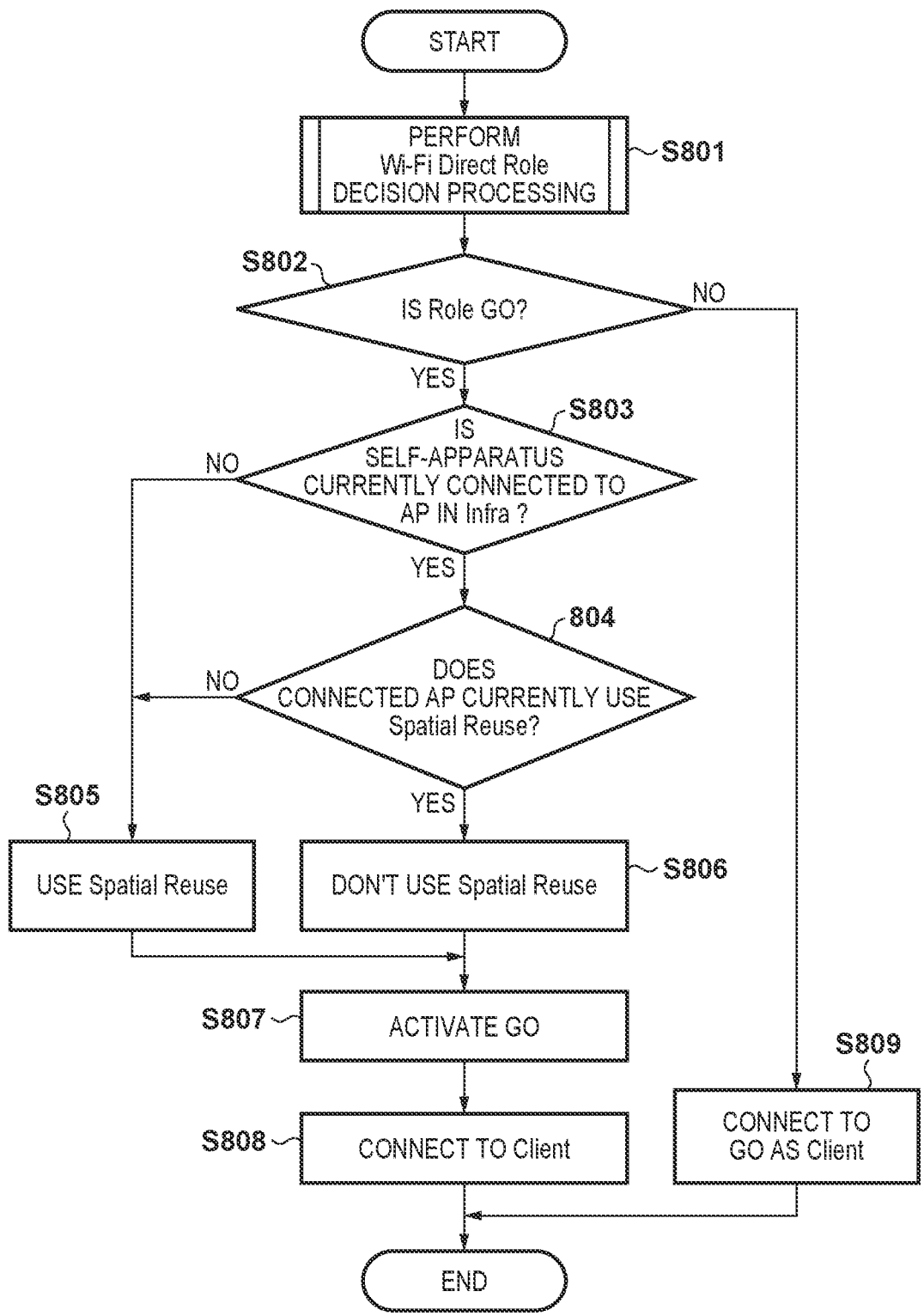

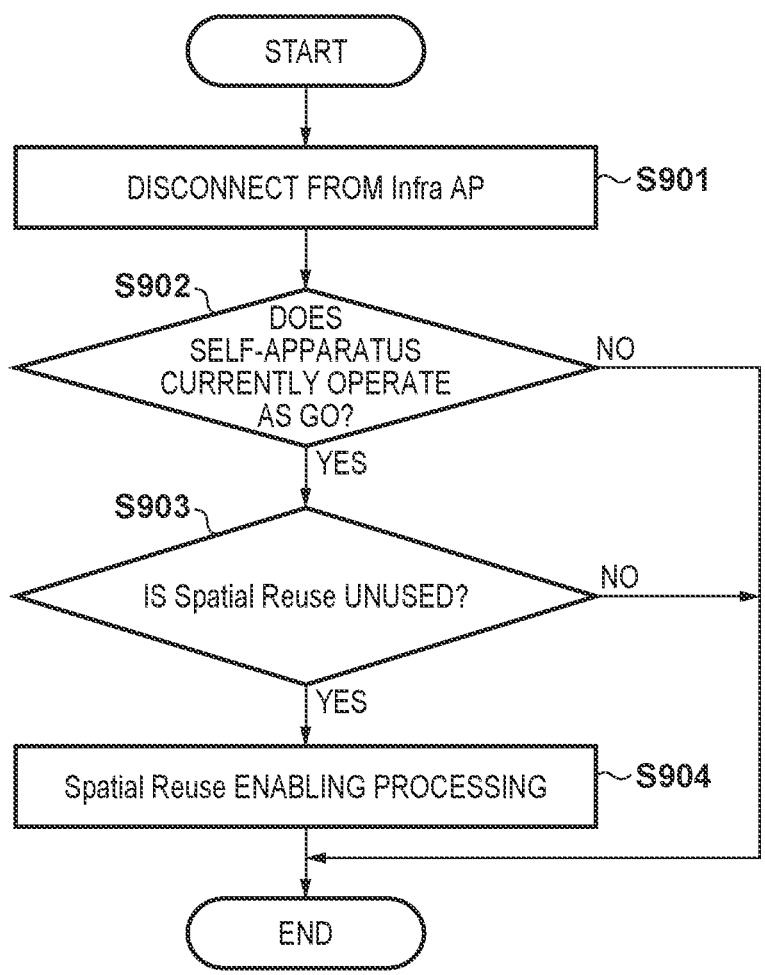

COMMUNICATION APPARATUS AND CONTROL METHOD THEREFOR

CROSS-REFERENCE TO RELATED APPLICATIONS

This application is a Continuation of International Patent Application No. PCT/JP2020/005840, filed Feb. 14, 2020, which claims the benefit of Japanese Patent Application No. 2019-061359 filed Mar. 27, 2019, both of which are hereby incorporated by reference herein in their entirety.

BACKGROUND OF THE INVENTION

Field of the Invention

The present invention relates to a wireless communication technique.

Background Art

In recent years, the IEEE802.11ax standard that aims at efficient use of wireless media in an environment in which a number of wireless communication apparatuses exist has been examined. SR (Spatial Reuse) processing has been examined as a technique for effectively using wireless media by a plurality of BSSs (Basic Service Sets). The SR processing is a communication technique for efficiently using wireless media in an OBSS (Overlapping BSS) environment in which a plurality of BSSs are arranged to overlap each other. A method of transmitting BSS Color information as identification information for identifying a BSS by including it in a physical layer header has been examined. PTL 1 discloses a technique of performing, using a BSS color, transmission control by determining whether a signal is an uplink signal or a downlink signal of an OBSS.

CITATION LIST

Patent Literature

PTL 1: Japanese Patent Laid-Open No. 2017-225091

In recent years, Wi-Fi Direct has been increasingly mounted on wireless LAN communication apparatuses. In Wi-Fi Direct, one communication apparatus operates as a simple access point (AP) called a group owner (GO), and a counter communication apparatus is wirelessly connected, as a client, to the GO to perform direct communication. The communication apparatus mounted with Wi-Fi Direct can perform so-called concurrent connection in which the apparatus is connected, as a station (STA) in an infrastructure mode, to a wireless network established by the AP while operating as a GO.

However, if, in concurrent connection, a network on the GO side established by the self-apparatus and a network to which the self-apparatus is connected as an STA operate using the same frequency and different BSS colors, signal collision highly probably occurs. For example, depending on a radio wave environment, at the timing when the self-apparatus transmits data to the AP via an interface (I/F) on the STA side, the client apparatus on the GO performs the SR processing to transmit data to the GO, resulting in signal collision.

The present invention has been made in consideration of the above problem, and provides a technique for making it possible to reduce signal collision in wireless communication.

SUMMARY OF THE INVENTION

To solve the above problem, a communication apparatus according to the present invention has the following arrangement. That is, a communication apparatus operable in both a base station mode of establishing a wireless network and accepting connection from another apparatus and a terminal mode of performing connection to a wireless network established by another apparatus comprises determination means for determining whether spatial reuse communication is usable in a first wireless network to be connected in the terminal mode, and decision means for deciding, based on determination by the determination means that the spatial reuse communication is usable in the first wireless network, to disable a function concerning the spatial reuse communication in a second wireless network established in the base station mode.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 8 is a flowchart illustrating an operation when starting Wi-Fi Direct connection in the printer.

FIG. 9 is a flowchart illustrating an operation when stopping infrastructure connection in the printer.

DESCRIPTION OF THE EMBODIMENTS

Figure 1:
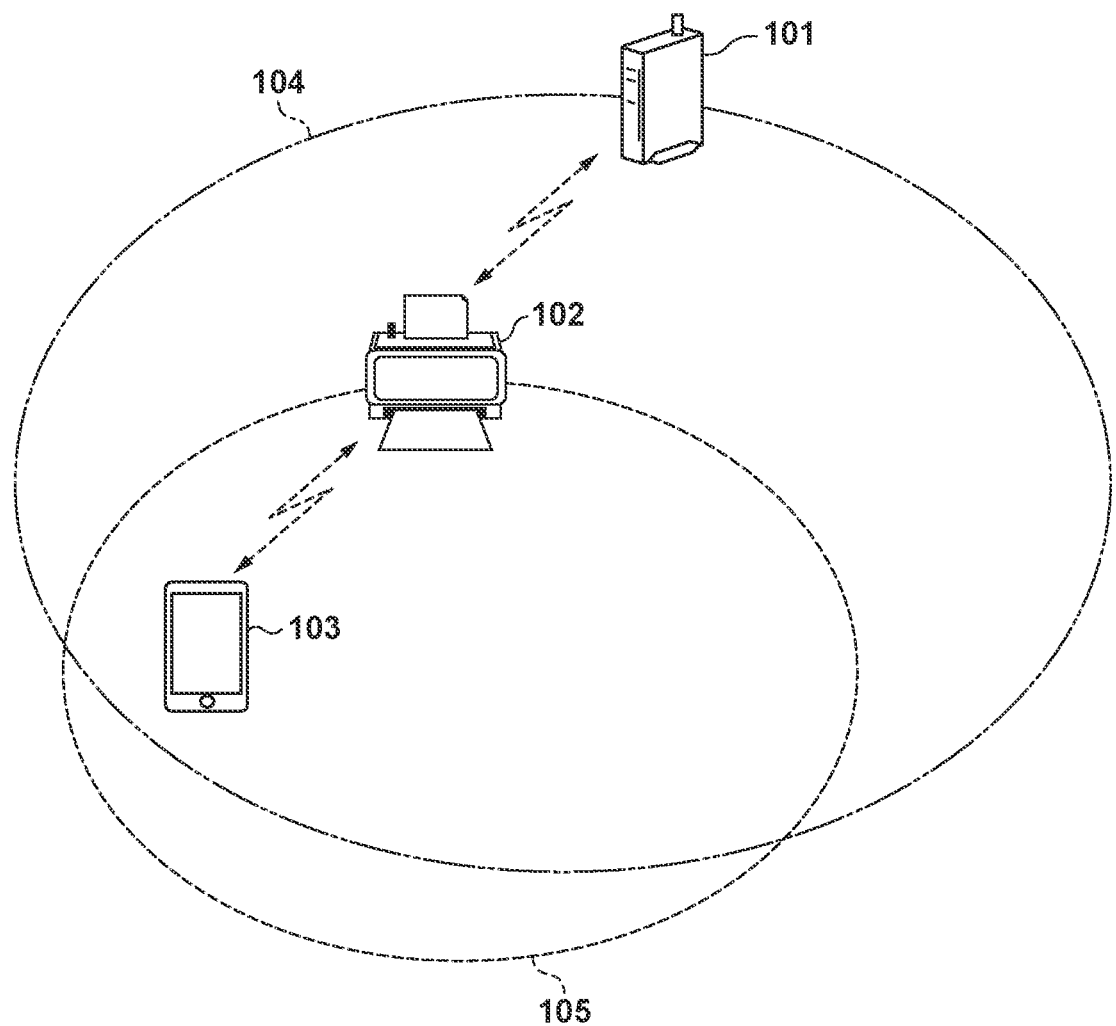
FIG. 1 is a view showing the configuration of a communication system according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A printer in a wireless LAN system will be exemplified as the first embodiment of a communication apparatus according to the present invention below. Note that an example in which a wireless LAN system complying with the IEEE (Institute of Electrical and Electronics Engineers) 802.11 series is used will be described below but other wireless communication standards may be used.

In a wireless LAN, collision avoidance by the CSMA/CA (Carrier Sense Multiple Access/Collision Avoidance) scheme is used. In CSMA/CA, it is determined whether another communication apparatus currently transmits a signal, and if it is determined that the other communication apparatus currently transmits no signal, a signal of a self-apparatus is transmitted, thereby avoiding signal collision.

Furthermore, in communication (spatial reuse communication) using SR (Spatial Reuse) processing, when another communication apparatus currently transmits a signal, if the self-apparatus receives the signal, it is identified whether the signal is a signal for a BSS to which the self-apparatus belongs. Then, if the signal is a signal for a BSS other than the BSS to which the self-apparatus belongs, it is determined whether the transmission signal of the self-apparatus influences another BSS. If it is determined that there is no influence, transmission of the signal from the self-apparatus makes it possible to efficiently use wireless media. Note that as a practical operation, two schemes of the OBSS_PD (Overlapping BSS Packet Detect) scheme and the SRP (Spatial Reuse Parameters) scheme have been examined.

The OBSS_PD scheme is a scheme in which if a received signal belongs to another BSS, a carrier sense level at which the signal of the self-apparatus can be transmitted is dynamically changed by controlling a carrier sense threshold and transmission power, thereby transmitting the signal. The SRP scheme is a scheme in which a notification of a parameter value concerning a reception interference level allowed in a BSS to which an access point (AP) belongs is made, and a terminal belonging to another BSS decides a transmission level based on the value to transmit a signal.

A communication apparatus capable of performing concurrent connection can perform wireless communication complying with the IEEE802.11ax standard (to be simply referred to as 802.11ax hereinafter) in both a network on the group owner (GO) side and the network of a connection destination AP to which the apparatus is connected as a station (STA). In 802.11ax, a BSS color is defined as identification information for identifying each network (BSS).

<System Configuration>

FIG. 1 is a view showing the configuration of a communication system according to the first embodiment. An access point (AP) 101 is a communication apparatus having the function of a base station, and each of a printer 102 and a smartphone 103 is a communication apparatus serving as a user terminal. Each of the printer 102 and the smartphone 103 has a Wi-Fi Direct function. In this example, the printer 102 operates as a Wi-Fi Direct GO and the smartphone 103 operates as a Wi-Fi Direct client.

A wireless network 104 is a network that connects the AP 101 and the printer 102, and a wireless network 105 is a wireless network that connects the printer 102 and the smartphone 103. Furthermore, the wireless network 104 is a wireless network formed by the AP 101, and the wireless network 105 is a wireless network formed by the printer 102.

That is, the AP 101 operates as an access point in an infrastructure (infra) mode in the wireless network 104. On the other hand, the printer 102 can operate as an STA in the infrastructure mode in the wireless network 104 while operating as a Wi-Fi Direct GO in the wireless network 105. Note that the printer 102 can perform a concurrent operation in which the operation as the STA and the operation as the GO as described above are performed concurrently. The smartphone 103 can operate as an STA in the infrastructure mode or a Wi-Fi Direct client in the wireless network 105. Note that the infrastructure mode in the printer 102 is a mode in which the printer 102 is connected, as a station (STA), to a wireless network established by an AP complying with the IEEE802.11 series standard.

Note that at the time of the concurrent operation, a wireless channel (frequency channel) when the smartphone 103 operates as a GO is the same as that of the wireless network 104 established by the AP 101. In addition, the AP 101, the printer 102, and the smartphone 103 comply with 802.11ax, and can perform operations based on the SR processing.

Note that in the following description, a plurality of apparatuses constituting the communication system will be described as the AP, printer, and smartphone. However, for example, other apparatuses such as a mobile phone, a PC, a video camera, a smartwatch, a PDA, and a camera may be used. A case in which one client is connected to the wireless network 105 established by the printer 102 as a GO will be described but two or more clients may be connected.

In the following description, a case in which the AP 101 and the printer 102 are connected to each other in the wireless LAN infrastructure mode, and the printer 102 and the smartphone 103 are connected to each other by Wi-Fi Direct will be described. Next, the functional arrangement of each apparatus constituting the communication system will be described. Note that the functional arrangement of the AP 101 is the same as the arrangement of a general access point operable with the 802.11ax function and a description thereof will be omitted.

Figure 2:
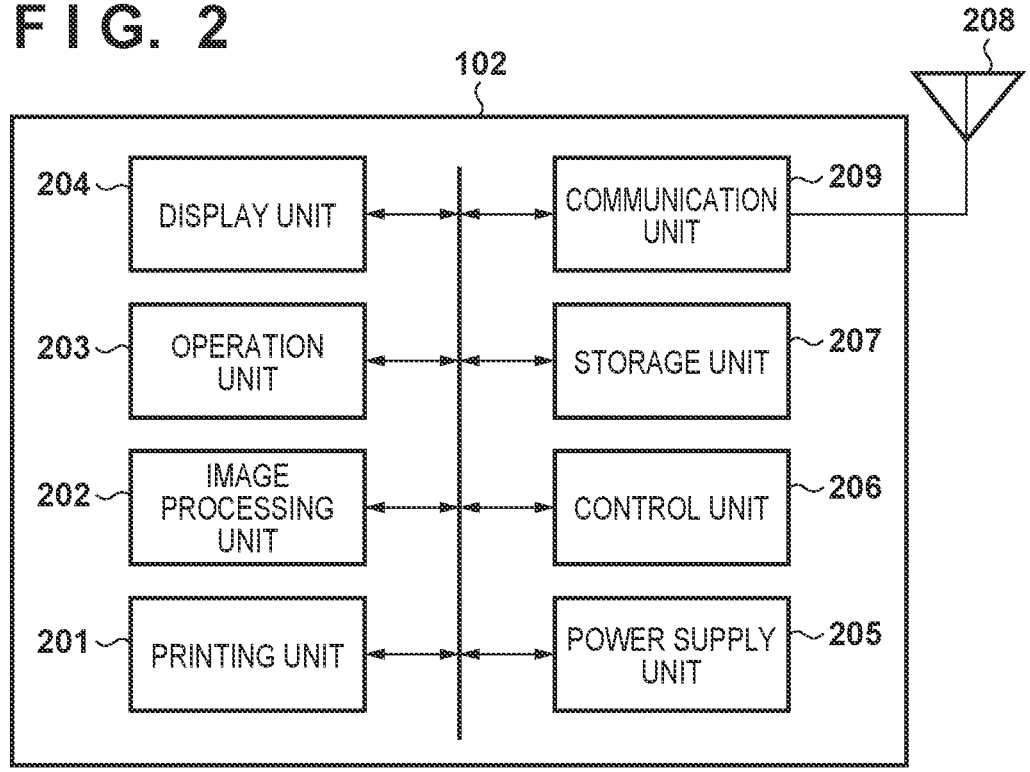
FIG. 2 is a block diagram showing the functional arrangement of a printer.

FIG. 2 is a block diagram showing the functional arrangement of the printer 102. A printing unit 201 performs print processing. An image processing unit 202 performs, before the printing unit 201 performs print processing, image processing of an image to be printed. An operation unit 203 accepts, from a user, various inputs to the printer 102 and the like. A control unit 206 controls the overall printer 102 based on information input via the operation unit 203. Among the pieces of information input via the operation unit 203, information that needs to be stored is stored in a memory such as a storage unit 207.

A display unit 204 has a function capable of outputting information that can visually be recognized or outputting the sound of a loudspeaker or the like. That is, the display unit 204 outputs at least one of visual information and sound information. If visual information is displayed, the display unit 204 includes a VRAM that holds image data corresponding to the visual information to be displayed. The display unit 204 performs display control to continuously display the image data stored in the VRAM.

A power supply unit 205 is a power supply unit that supplies power to each unit of the printer 102. The power supply unit 205 obtains power from, for example, an AC power supply or a battery. The control unit 206 controls the overall printer by executing a control program stored in the storage unit 207. The control unit 206 is formed by a CPU or an MPU. Note that the overall printer 102 may be controlled in cooperation with an OS (Operating System) executed by the control unit 206. Various operations (to be described later) are performed when the control unit 206 executes the control program stored in the storage unit 207.

The storage unit 207 stores various kinds of information such as the control program to be executed by the control unit 206 and information concerning communication. The storage unit 207 is formed by a storage medium such as an HDD, a flash memory, a detachable SD card, a ROM, or a RAM.

An antenna 208 is an antenna capable of performing communication in a 2.4-GHz band and/or a 5-GHz band for performing wireless LAN communication. A communication unit 209 is a wireless communication unit for performing wireless LAN communication complying with the IEEE802.11 series. As described above, wireless communication complying with 802.11ax is also possible. Assume here that the communication unit 209 of the printer 102 is formed by one chip (one RF (Radio Frequency) circuit).

Figure 3:
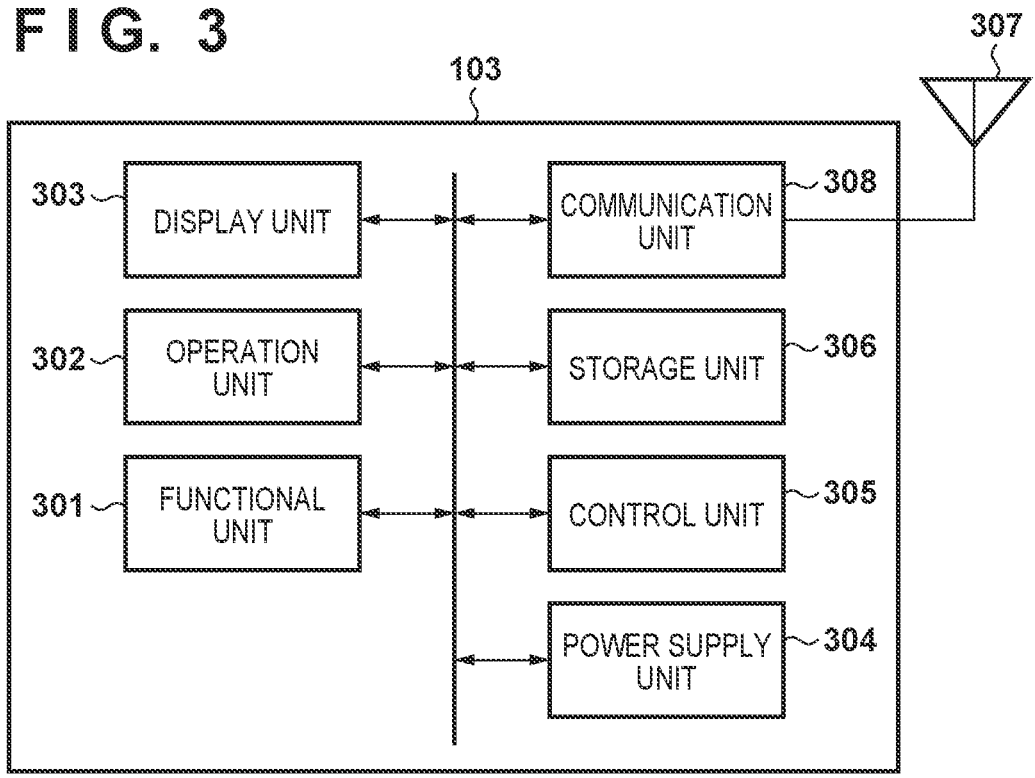
FIG. 3 is a block diagram showing the functional arrangement of a smartphone.

FIG. 3 is a block diagram showing the functional arrangement of the smartphone 103. A functional unit 301 provides a function unique to the smartphone. The functional unit 301 is implemented by predetermined hardware, predetermined software, or a combination thereof. An operation unit 302 accepts, from a user, various inputs to the smartphone 103 and the like. A control unit 305 controls the overall smartphone 103 based on information input via the operation unit 302. Among the pieces of information input via the operation unit 302, information that needs to be stored is stored in a memory such as a storage unit 306.

A display unit 303 has a function capable of outputting information that can visually be recognized or outputting the sound of a loudspeaker or the like. That is, the display unit 303 outputs at least one of visual information and sound information. If visual information is displayed, the display unit 303 includes a VRAM that holds image data corresponding to the visual information to be displayed. The display unit 303 performs display control to continuously display the image data stored in the VRAM.

A power supply unit 304 is a power supply unit that supplies power to each unit of the smartphone 103. The power supply unit 304 obtains power from, for example, an AC power supply or a battery. The control unit 305 controls the overall smartphone by executing a control program stored in the storage unit 306. The control unit 305 is formed by a CPU or an MPU. Note that the overall smartphone 103 may be controlled in cooperation with an OS (Operating System) executed by the control unit 305. Various operations (to be described later) are performed when the control unit 305 executes the control program stored in the storage unit 306.

The storage unit 306 stores various kinds of information such as the control program to be executed by the control unit 305 and information concerning communication. The storage unit 306 is formed by a storage medium such as an HDD, a flash memory, a detachable SD card, a ROM, or a RAM.

An antenna 307 is an antenna capable of performing communication in a 2.4-GHz band and/or a 5-GHz band for performing wireless LAN communication. A communication unit 308 is hardware for performing wireless LAN communication complying with the IEEE802.11 series. As described above, wireless communication complying with 802.11ax is also possible.

<Operation of System>

Subsequently, the operation of the communication system having the above-described arrangement will be described. For the sake of descriptive simplicity, assume that the printer 102 performs connection processing to the AP 101 in the wireless LAN infrastructure mode, and then performs connection processing to the smartphone 103 by Wi-Fi Direct. Assume also that the wireless network 104 is established by the AP 101, and the AP 101 and the printer 102 perform wireless LAN communication complying with 802.11ax. Furthermore, the wireless network 105 is established by the printer 102 operating as a GO, and the smartphone 103 serves as a client to perform Wi-Fi Direct connection. The printer 102 and the smartphone 103 perform wireless LAN communication complying with 802.11ax.

In addition, both the wireless networks 104 and 105 can be established to be able to use the SR processing. Whether to actually enable the SR processing is decided by the apparatus that establishes the wireless network. As a scheme used for the SR processing, either the above-described OBSS_PD scheme or the above-described SRP scheme may be used, and the present invention is not limited to them.

Figure 4:
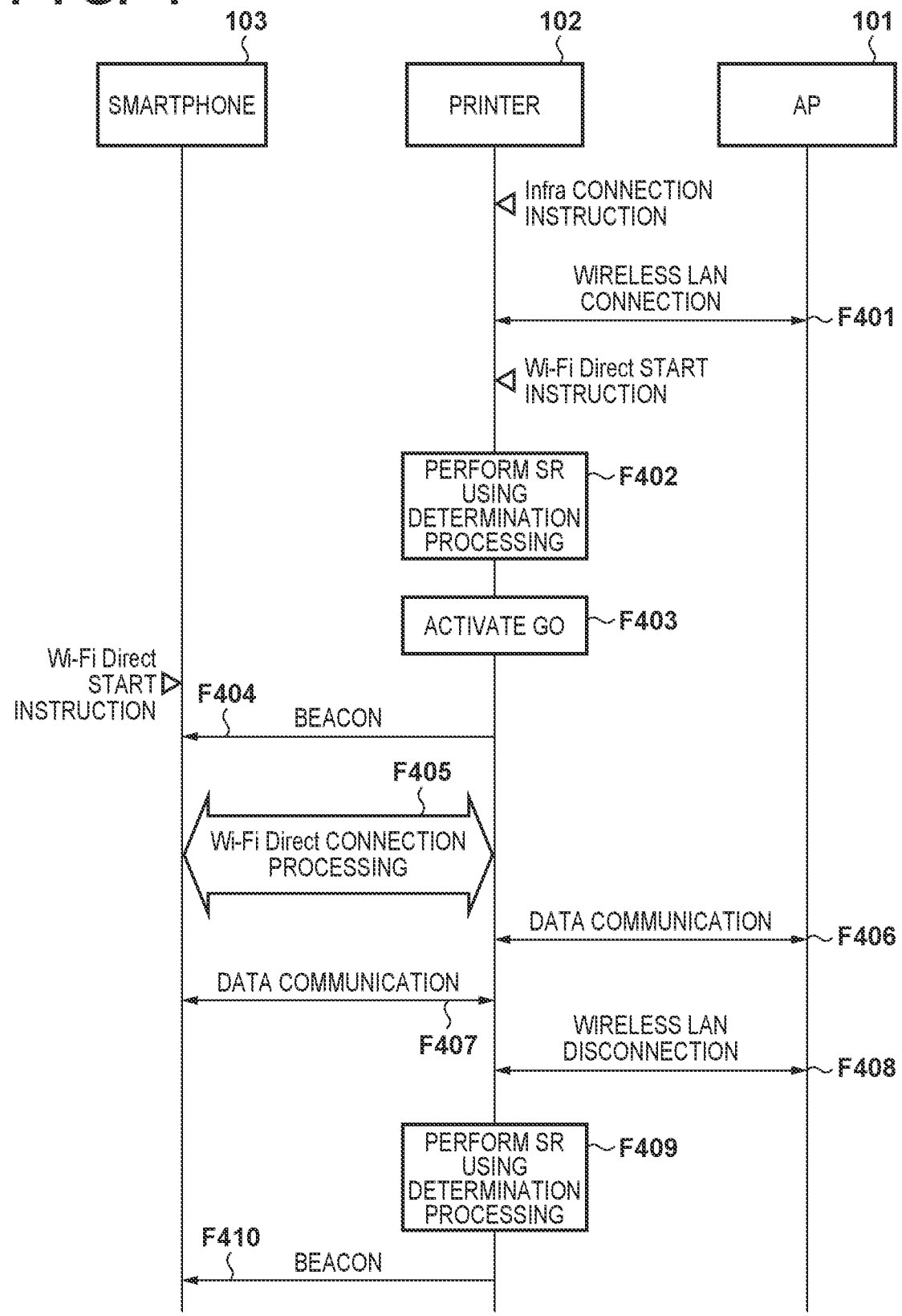
FIG. 4 is a sequence chart showing a communication sequence according to the first embodiment.

FIG. 4 is a sequence chart showing a communication sequence according to the first embodiment. This sequence starts when the printer 102 accepts an infrastructure connection instruction from the user via the operation unit 203.

After accepting the infrastructure connection instruction, the printer 102 performs wireless LAN connection to the AP 101 in the infrastructure mode (F401). Connection to the AP 101 may be performed by inputting the wireless LAN parameters (an SSID, a passphrase, and the like) of the AP 101 via the operation unit 203 of the printer 102. Alternatively, connection to the AP 101 may be performed using a protocol that automatically sets parameters, such as WPS (Wi-Fi Protected Setup) or DPP (Device Provisioning Protocol). The present invention, however, is not limited to them.

The wireless network 104 established by the AP 101 is a wireless network complying with 802.11ax, and is in a state in which the SR processing is enabled. A BSS color is used as information for identifying a BSS, and "Color1" is used as a BSS color value in the wireless network 104. Although it is assumed that BSS color information is included in the physical layer header of a wireless frame to be transmitted by the AP 101 and then transmitted, details will be described later.

By receiving the wireless frame transmitted by the AP 101 in the process of performing connection to the AP 101, the printer 102 can identify that the BSS color of the wireless network 104 established by the AP 101 is "Color1". After the printer 102 is connected to the wireless network 104 established by the AP 101, when the self-apparatus transmits a wireless frame to the wireless network 104, it transmits a predetermined wireless frame by including "Color1" in it. This allows the AP 101 to identify that the wireless frame is a wireless frame belonging to the wireless network 104. Assume here that the printer 102 stores "Color1" as the BSS color value of the connected AP 101 in the storage unit 207.

Subsequently, after completion of connection to the AP 101, the printer 102 receives a Wi-Fi Direct start instruction from the user via the operation unit 203. Assume here that since the printer 102 is in a state in which it is already connected to the AP 101 in the infrastructure mode at the time of receiving the Wi-Fi Direct start instruction, the printer 102 operates as a GO and determines to perform a concurrent operation. That is, the printer 102 is activated as a GO in an autonomous GO mode of Wi-Fi Direct. The autonomous GO mode is a mode of autonomously activating the apparatus as a GO by skipping processing (GO (Group Owner) negotiation processing) of deciding a role (GO or client) in Wi-Fi Direct with the counter apparatus.

If the printer 102 determines to be activated as a GO, it serves as a GO to establish the wireless network 105 which complies with 802.11ax. Note that the wireless channel of the wireless network 105 established by the printer 102 as a. GO is the same as that of the wireless network 104 established by the AP 101.

The printer 102 performs determination processing with respect to the use of the SR processing of the wireless network 105 established by itself as a GO (F402). In this example, since the SR processing is used in the wireless network 104 established by the AP 101, the printer 102 determines to serve as a GO to establish the wireless network 105 without using the SR processing. Note that details of the determination processing will be described later. The printer 102 is activated as a GO, and establishes the wireless network 105 while the SR processing is disabled (F403).

Subsequently, the smartphone 103 receives a Wi-Fi Direct start instruction from the user via the operation unit 302. After receiving the Wi-Fi Direct start instruction, the smartphone 103 performs Wi-Fi Direct terminal search processing. The printer 102 serves as a GO to establish the wireless network 105, and is in a state in which it transmits a beacon (F404).

The smartphone 103 receives the beacon in the search processing. Alternatively, the smartphone 103 transmits a Probe_Request packet including a Wi-Fi Direct information element (IE), and receives a Probe_Response packet transmitted from the printer 102 as a response to the Probe_Request packet. The Probe_Response packet includes the Wi-Fi Direct IE. The smartphone 103 can detect, by the search processing, that the printer 102 operates as a GO. At this time, the smartphone 103 detects, from the information included in the wireless frame such as the Probe_Response packet or the beacon transmitted by the printer 102, that the SR function is not used in the wireless network 105. The smartphone 103 displays, on the display unit 303, a list of Wi-Fi Direct terminals found by the search processing, selects a connection destination by user selection, and is connected to it. Assume here that the printer 102 is selected as a connection destination. After that, connection processing by Wi-Fi Direct is performed between the printer 102 and the smartphone 103 (F405).

Upon completion of the connection processing, the printer 102 and the AP 101 can perform data communication via the wireless network 104 (F406). Similarly, the printer 102 and the smartphone 103 can perform data communication via the wireless network 105 (F407). At this time, the SR processing is not enabled in the wireless network 105. After that, upon completion of data communication with the AP 101, the printer 102 disconnects the wireless LAN connection from the AP 101 (F408).

The printer 102 performs determination processing with respect to the use of the SR processing using, as a trigger, disconnection from the AP 101 (F409). Since the wireless LAN connection is disconnected from the AP 101, the printer 102 transmits no data to the wireless network 104. That is, the printer 102 is set in a state in which even if the SR processing is enabled in the wireless network 105, a signal transmitted to the wireless network 104 does not collide with a signal received in the wireless network 105. In this state, in consideration of efficient use of wireless media, the SR processing is desirably used in each wireless network. To achieve this, the printer 102 determines to enable the SR processing in the wireless network 105. The printer 102 performs processing of enabling the SR processing the wireless network 105, and performs, with the smartphone 103, data communication in which the SR processing is enabled.

Figure 5:
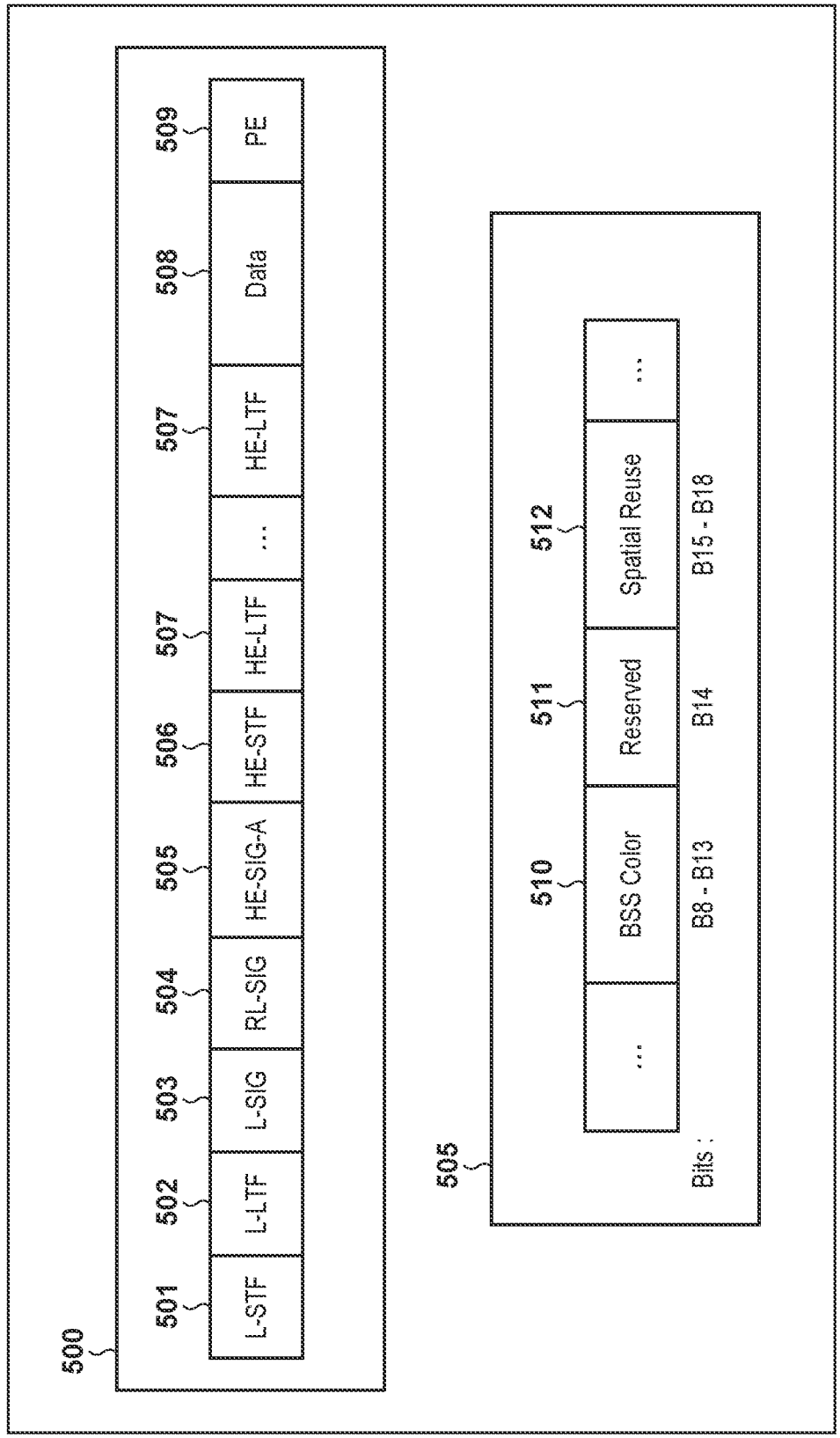
FIG. 5 is a view showing an example of a frame format in a PHY layer.

FIG. 5 is a view showing an example of a frame format in a. PHY layer. More specifically, FIG. 5 shows an HE_S-U_PPDU (High Efficiency Single User PLCP Packet Data Unit) frame as a kind of physical layer frame in 802.11ax. As will be described later, the HE_SU_PPDU frame includes information associated with the function of the SR processing.

An HE_SU_PPDU frame 500 includes fields for a legacy terminal (HE-incompatible terminal), fields for an HE-compatible terminal, a data payload portion 508, and a PE (Packet Extension) field 509.

More specifically, an L-STF (Legacy Short Training Field) field 501, an L-LTF (Legacy Long Training Field) field 502, and an L-SIG (Legacy Signal) field 503 are included. Furthermore, an RL-SIG (Repeated Legacy Signal) field 504 as a repetition symbol of the L-SIG field is included. The RL-SIG field 504 can be used to distinguish whether the format is a format for an HE-compatible terminal. Furthermore, an HE-SIG-A (High Efficiency Signal-A) field 505, an HE-STF (High Efficiency Short Training Field) field 506, and an HE-LTF (High Efficiency Long Training Field) field 507 are included.

The HE-SIG-A field 505 is formed from a plurality of fields, and is formed by an HE-SIG-A1 field and an HE-SIG-A2 field in the HE_SU_PPDU format. The HE-SIG-A1 field includes a BSS_Color field 510 as a field for identifying the BSS color information. The BSS_Color field is a 6-bit information element, and can take a value from 0 to 63. By using the BSS color value, it can be determined whether the BSS is the same among OBSSs. Similarly, the HE-SIG-A1 field includes a Spatial_Reuse field 512 in which information associated with the function of the SR processing is set, thus making a notification.

Note that the above-described format is merely an example, and the HE_PPDU-related format is formed by a format complying with 802.11ax.

Figure 6:
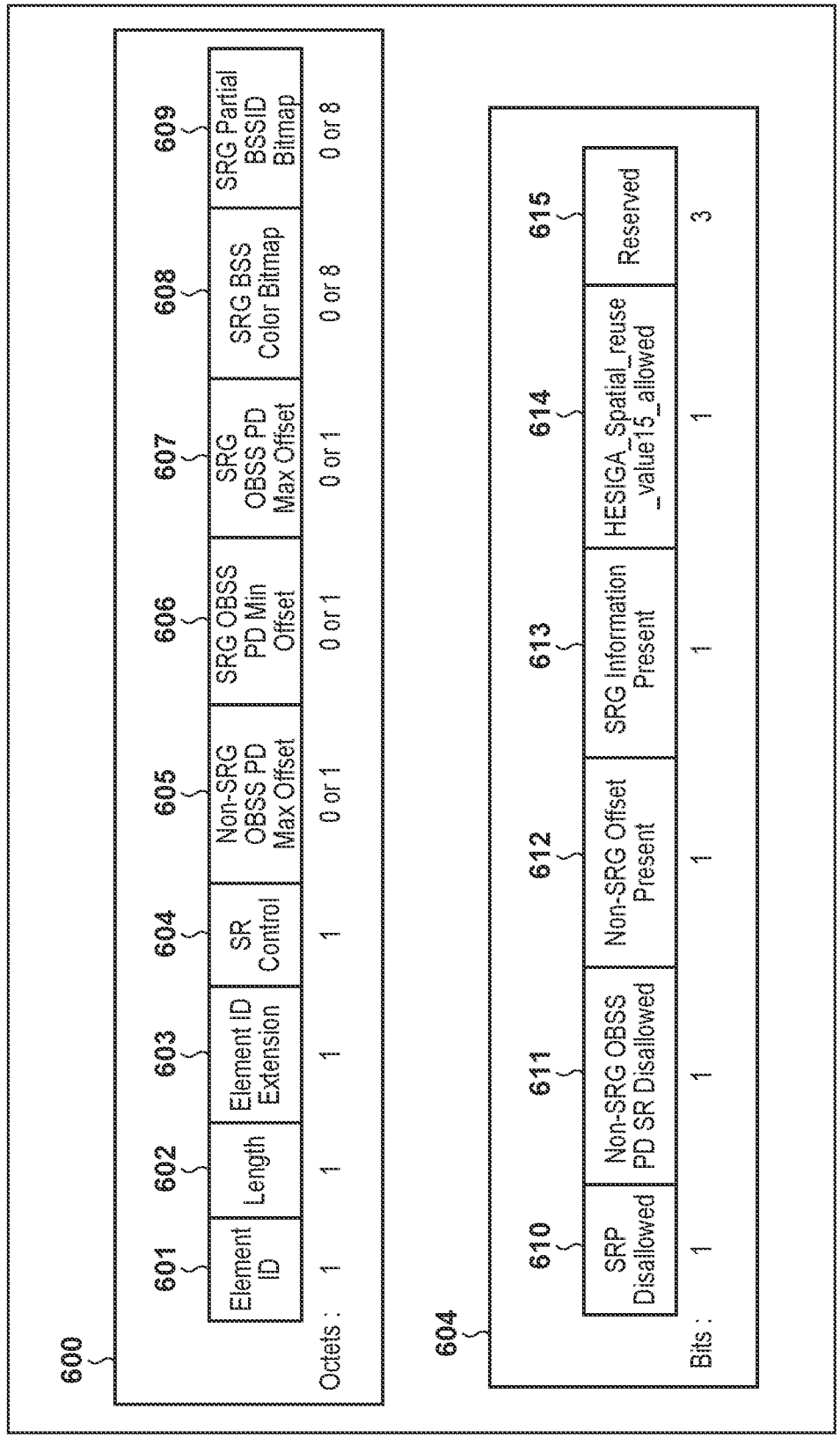
FIG. 6 is a view showing an example of the format of an information element (IE).
Figure 7:
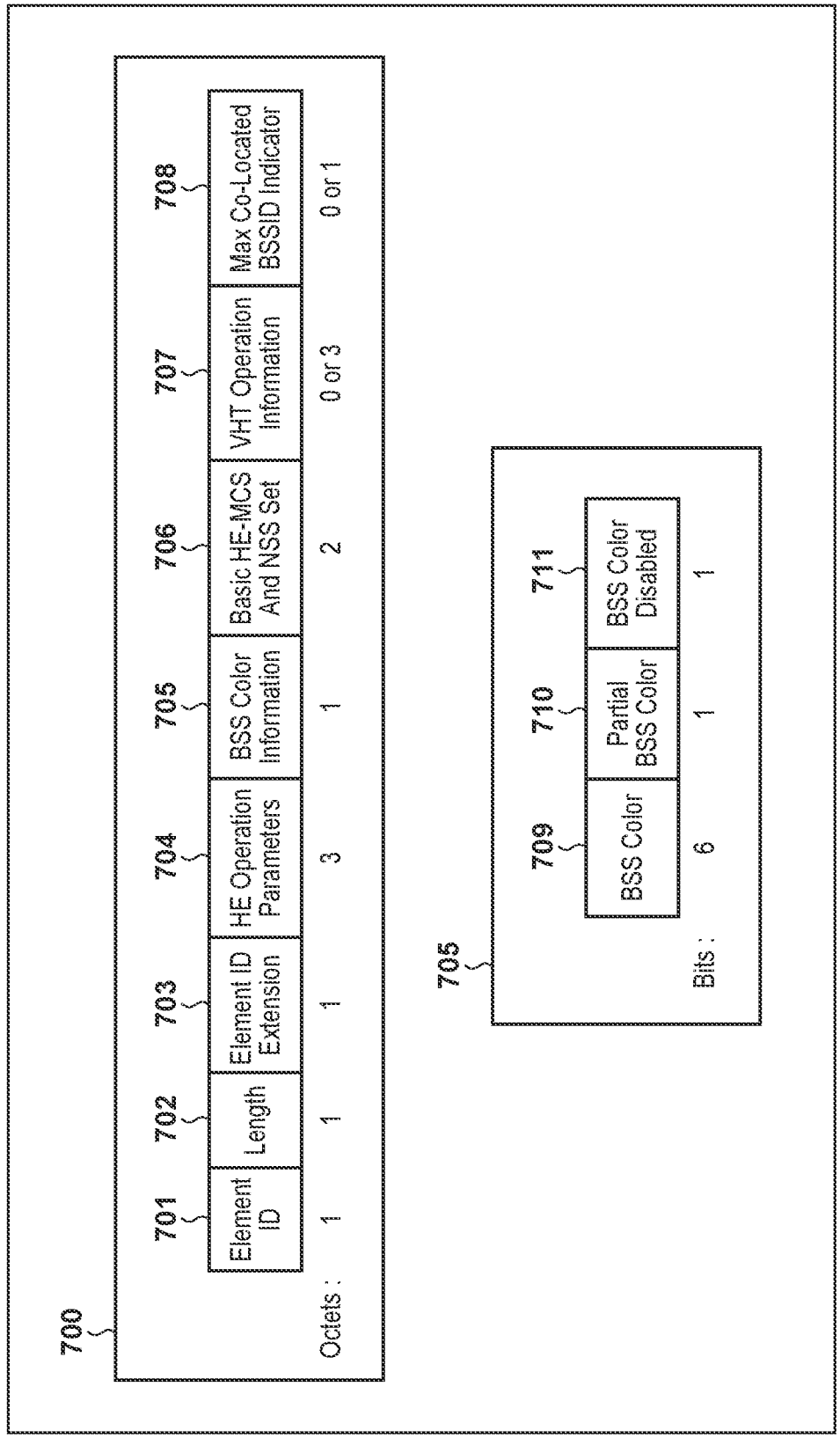
FIG. 7 is a view showing an example of the format of an information element (IE).

FIGS. 6 and 7 are views each showing an example of a frame format in a MAC layer and showing an example of the format of the information element (IE) associated with the function of the SR processing. The information associated with the SR processing is included in a MAC frame and transmitted/received, thereby making it possible to perform control associated with the SR processing.

FIG. 6 shows the format of an SR_Parameter_set element. By adding the SR_Parameter_set element to a predetermined MAC frame, it is possible to perform control associated with the SR processing between communication apparatuses.

The SR_Parameter_set element is formed from a plurality of fields. An Element_ID field 601, a Length field 602, and an Element_ID_Extension field 603 are fields including basic information for identifying data of the information element. An SR_Control field 604 makes it possible to perform more detailed control associated with the SR processing by parameters of subfields (to be described later). A Non-SRG (SR_Group)_OBSS_PD_Max_Offset field 605 is used to generate the value of a Non-SRG_OBSS_PD_Max parameter. An SRG_OBSS_PD_Min_Offset field 606 is used to generate the value of an SRG_OBSS_PD_Min parameter. An SRG_OBSS_PD_Max_Offset field 607 is used to generate the value of an SRG_OBSS_PD_Max parameter.

The OBSS_PD scheme as one of the above-described SR processing schemes will now be described in more detail. The OBSS_PD scheme is further classified into two processing types. One is processing that uses a Non-SRG_OBSS_PD level, and is a processing method when a packet other than an SRG packet is detected. The other is processing that uses an SRG_OBSS_PD level, and is a processing method when an SRG packet is detected. The above-described fields 605, 606, and 607 are parameters associated with the two processing schemes, and are used to calculate a signal strength value to be used for packet detection.

An SRG_BSS_Color_Bitmap field 608 is a field representing, by a bitmap, the BSS color value used in an SRG to which the apparatus that transmits a signal belongs as a member. An SRG Partial BSSID Bitmap field 609 is a field representing, by a bitmap, a partial value of a BSSID used in the SRG to which the apparatus that transmits a signal belongs as a member.

The SR_Control field 604 is formed from a plurality of subfields. An SRP_Disallowed subfield 610 indicates whether the SR processing by the SRP scheme is disabled in the wireless network established by the AP. A Non-SR-G_OBSS_PD_SR_Disallowed subfield 611 indicates whether the SR processing using the Non-SRG_OBSS_PD level is disabled in the wireless network established by the AP. A Non-SRG_Offset_Present subfield 612 indicates whether the Non-SRG_OBSS_PD_Max_Offset field 605 is included in the frame. An SRG_Information_Present subfield 613 indicates whether the above-described fields 606, 607, 608, and 609 are included in the SR_Parameter_set element. The information associated with the SRG can be shared using these fields. An HESIGA_Spatial_reuse_value15_allowed subfield 614 indicates whether it is possible to set the value of an SRP_AND_NON_SRG_OBSS_PD_PROHIBITED field with respect to the SPATIAL_REUSE parameter as a parameter in TXVECTOR between MAC and PHY. With this parameter, it is possible to prohibit the SR processing by the SRP scheme and the OBSS_PD scheme using the Non_SR-G_OBSS_PD level during transmission of a target PPDU.

FIG. 7 shows the format of an HE_Operation element. The BSS color information is included in a MAC frame and transmitted/received, thereby making it possible to perform control associated with the BSS color. That is, by adding the HE_Operation element to a predetermined MAC frame, it is possible to perform high efficiency control of the STA apparatus in the BSS.

The HE_Operation element is formed from a plurality of fields. An Element_ID field 701, a Length field 702, and an Element_ID_Extension field 703 are fields including basic information for identifying data of the information element. An HE_Operation_Parameters field 704 includes parameters necessary for high efficiency processing. A BSS_Color_Information field 705 includes information concerning the BSS color. A VHT (Very High Throughput)_Operation_Information field 707 includes information for making a notification of the presence/absence of information concerning VHT processing (high speed transmission processing). A MAX_Co-Located_BSSID_Indicator field 708 includes information associated with the maximum number of coexisting BSSs. The coexisting BSSs indicate a plurality of BSSs that operate using the same wireless channel and the same frequency band by, for example, sharing the same antenna connector.

The BSS_Color_Information field 705 is formed from a plurality of subfields. A BSS_Color subfield 709 includes identification information of the BSS color. A Partial_BSS_Color subfield 710 includes information indicating whether an AID (Association IDentifier) assignment rule based on the BSS color is applied to the BSS. An AID is an identifier assigned by the AP for distinguishing a connected terminal. A BSS_Color_Disabled subfield 711 can be used to indicate that the use of the BSS color is temporarily stopped when, for example, the HE-compatible terminal detects duplication of the BSS color.

This is merely an example, and a format complying with the 802.11ax specification is used as the MAC frame format associated with the BSS color.

FIG. 8 is a flowchart illustrating an operation when starting Wi-Fi Direct connection in the printer. A description will be provided by assuming that the operation is processed at a timing when the printer 102 receives a Wi-Fi Direct start instruction in FIG. 4 but the present invention is not limited to this. The operation may be performed when it is determined by a program or the like to start Wi-Fi Direct connection.

In step S801, the printer 102 performs processing of deciding the role of the self-apparatus in Wi-Fi Direct. More specifically, the printer 102 may perform GO negotiation processing in Wi-Fi Direct with a counter apparatus, and then decide the role. Alternatively, the printer 102 may decide to be activated in the above-described autonomous GO mode (the role is a GO). In this case, for example, the printer 102 determines whether it is currently connected to the AP in the infrastructure mode, and decides, if it is currently connected to the AP, to be activated in the autonomous GO mode. Alternatively, the printer 102 may prompt the user to select the role via a UI (for example, the operation unit 203), and the present invention is not limited to this.

In step S802, the printer 102 determines whether the role of the self-apparatus decided in the role decision processing is a GO. If the role is a GO, the process advances to step S803. If the role is a client, the process advances to step S809.

In step S803, the printer 102 determines whether the self-apparatus is currently connected to the AP in the infrastructure mode. If the self-apparatus is currently connected to the AP, the process advances to step S804; otherwise, the process advances to step S805. The determination processing may be performed not only based on whether the self-apparatus is currently connected to the AP but also based on whether connection processing to the AP is currently performed. For example, if the self-apparatus is not currently connected to the AP but currently performs the connection processing to the target AP, the process may advance to step S804.

In step S804, the printer 102 determines whether the currently connected AP (or connection destination AP) currently uses the SR processing. Whether the connection destination AP currently uses the SR processing can be determined by receiving a wireless frame transmitted from the AP and using information included in the frame. If the connection destination AP currently uses the SR processing, the process advances to step S806; otherwise, the process advances to step S805. Note that it is determined here whether the AP currently connected in the infrastructure mode currently uses the SR processing but the determination processing may be performed based on whether the target AP complies with 802.11ax. If the target AP does not comply with 802.11ax, the process advances to step S805; otherwise, it may be determined whether the AP currently uses the SR processing.

In step S805, the printer 102 determines to use the SR processing in the wireless network 105 established by itself as a GO. On the other hand, in step S806, the printer 102 determines not to use the SR processing in the wireless network 105 established by itself as a GO.

A method when the SR processing is not used will now be exemplified. If the SR processing is not used in the wireless network established by the self-apparatus as a GO, an SR_Parameter_set element 600 described above can be used. The value of the SRG_Information_Present subfield 613 included in the SR_Parameter_set element 600 is invalidated (set to 0). Thus, the information associated with the SRG is not included in the SR_Parameter_set element.

Therefore, no SRG exists in the wireless network established by the self-apparatus as a GO, and the SR processing using the SRG_OBSS_PD level in the OBSS_PD scheme is not performed. Similarly, the value of the SRP_Disallowed subfield 610 is validated (set to 1). This sets a state in which the SR processing by the SRP scheme is disallowed in the wireless network established by the self-apparatus as a GO. Furthermore, the value of the Non-SRG_OBSS_PD_SR_Disallowed field 611 is validated (set to 1). This sets a state in which the SR processing using the Non-SRG_OBSS_PD level in the OBSS_PD scheme is disallowed in the wireless network established by the self-apparatus as a GO.

The SR_Parameter_set element set by these values is added, as an information element, to a wireless frame (a beacon, a Probe_Response packet, or the like) to be transmitted from the GO to the client, thus making a notification. This can restrict the use of the SR processing on the client side in the wireless network 105.

Note that after it is determined not to use the SR processing, the display unit 204 may display, to the user, information indicating that the SR processing is not used in the wireless network 105, thus making a notification. Alternatively, the user may be prompted to select, on the display unit 204, whether to use the SR processing in the wireless network 105. Based on the user selection result via the operation unit 203, it may be determined whether to use the SR processing.

Note that the method of disallowing the use of the SR processing in the wireless network 105 is merely an example, and the present invention is not limited to this. The method may be implemented by controlling another parameter. For example, control may be performed using a parameter included in an HE_Capability element added to a MAC frame. For example, an SRP-based_SR_Support subfield in an HE_PHY_Capabilities_Information field can be used. This indicates whether to support the SR processing by the SRP scheme. Furthermore, the HE_Capability element indicating that the SR processing is not supported may be added to a predetermined wireless frame and transmitted.

Alternatively, the method may be implemented by controlling the parameter of the header information of the PHY frame. The Spatial_Reuse field 512 included in the HE-SIG-A field 505 in the above-described PHY header may be used. A wireless frame including a PHY header in which the parameter value of the SRP_DISALLOW or SPR_AND_NON_SRG_OBSS_PD_PROHIBITED field is set as the value of the Spatial_Reuse field may be transmitted. Since this sets a state in which the SR processing cannot be used on the client side while the GO transmits the wireless frame, it is possible to reduce collision of signals transmitted/received between the GO and the client.

The method may be implemented using a parameter complying with 802.11ax or implemented by extending another wireless frame. These methods may be performed individually or in combination.

In step S807, the printer 102 performs GO activation processing. Whether to use the SR processing in the wireless network established by the self-apparatus as a GO is determined based on the determination result in step S805 or S806. After the printer 102 is activated as a GO, it transmits a beacon and establishes the wireless network 105. In step S808, the printer 102 performs connection processing to the client of the counter apparatus in the wireless network 105 established by the self-apparatus as a GO. Upon completion of the connection processing, the printer 102 starts Wi-Fi Direct communication with the client of the counter apparatus.

On the other hand, if it is determined in step S802 that the self-apparatus operates as a client, the printer 102 operates as a client and performs connection processing to the GO of the counter apparatus in step S809, thereby starting Wi-Fi Direct communication.

FIG. 9 is a flowchart illustrating an operation when stopping infrastructure connection in the printer. Infrastructure connection stop processing may start based on a user instruction or autonomously start by determination by a program. For example, if the beacon of the counter AP cannot be obtained or a disconnection packet (Deauthentication frame or the like) is explicitly received from the AP, the infrastructure connection stop processing starts. Assume here that the printer 102 performs the infrastructure connection stop processing at the time of wireless LAN disconnection (F408) in FIG. 4.

In step S901, the printer 102 performs disconnection processing from the AP currently connected in the infrastructure mode. For example, disconnection can be performed by transmitting a Disassociation frame to the AP. Note that the disconnection processing is not limited to this. The disconnection processing may be performed when the beacon cannot be received from the AP or the AP explicitly performs disconnection by a Deauthentication frame, as described above, and the present invention is not limited to this. Upon completion of disconnection from the AP, the process advances to step S902.

In step S902, the printer 102 determines whether the self-apparatus currently operates as a GO. If the self-apparatus currently operates as a GO, the process advances to step S903; otherwise, the infrastructure connection stop processing ends.

In step S903, the printer 102 determines whether the SR processing is currently used in the wireless network 105 established by itself as a GO. If the SR processing is not currently used, the process advances to step S904; otherwise, the infrastructure connection stop processing ends.

In step S904, the printer 102 performs processing of setting a state in which the SR processing in the wireless network 105 is usable. In this processing, the printer 102 determines to enable the SR processing in consideration of efficient use of wireless media between the wireless networks 104 and 105, as described above in the explanation of the processing of FIG. 4 (F408). For example, by performing the following processing, the state can be changed to a state in which the SR processing is usable.

The value of the SRG_Information_Present subfield 613 included in the SR_Parameter_set element 600 is validated (set to 1). In addition, information is input to the fields 606, 607, 608, and 609 associated with the SRG and added to the SR_Parameter_set element. This sets a state in which the SRG information is enabled in the wireless network established by the GO. In the wireless network 105, the SR processing using the SRG_OBSS_PD_level in the OBSS_PD scheme can be used.

Similarly, the value of the SRP_Disallowed subfield 610 is invalidated (set to 0). This sets a state in which the SR processing by the SRP scheme is allowed in the wireless network established by the GO. Furthermore, the value of the Non-SRG_OBSS_PD_SR_Disallowed field 611 is invalidated (set to 0). This sets a state in which the SR processing using the Non_SRG_OBSS_PD level in the OBSS_PD scheme is allowed in the wireless network established by the GO. The SR_Parameter_set element set by these values is added, as an information element, to a wireless frame (a beacon, a Probe_Response packet, or the like) to be transmitted from the GO to the client, and then the wireless frame is transmitted. This can allow the use of the SR processing on the client side.

Note that the method of allowing the use of the SR processing is not limited to this. The parameter of another information element that can be added to a MAC frame may be controlled and transmitted. Furthermore, a value indicating that the SR processing is usable may be set in the Spatial_Reuse field included in the HE-SIG-A field or the like in the header of the PHY frame and then the wireless frame may be transmitted. Alternatively, another wireless frame may be extended and transmitted, thus making a notification.

When making the SR processing usable in the wireless network 105 of the GO, the display unit 204 may display, to the user, information indicating that the SR processing is made usable in the wireless network 105, thus making a notification. Alternatively, the user may be prompted to select, on the display unit 204, whether to make the SR processing usable in the wireless network 105. Based on the user selection result via the operation unit 203, it may be determined whether to make the SR processing usable.

As described above, according to the first embodiment, when the printer 102 performs a concurrent operation, the availability (enabling/disabling) of the SR processing in the wireless network 105 established in the base station mode (by the Wi-Fi Direct GO) is controlled. More specifically, when the SR processing is enabled in the wireless network 104 connected in the terminal mode (by the STA in the infrastructure mode), the SR processing in the wireless network 105 is disabled. This can reduce the occurrence of signal collision between these wireless networks.

Note that in the above description, the sequence of activating the printer 102 as a Wi-Fi Direct GO after the printer 102 is connected, as an STA in the infrastructure mode, to the AP 101 has been described as the concurrent operation of the printer 102. The present invention, however, is not limited to this. A sequence of connecting, to the AP 101, the printer 102 as an STA in the infrastructure mode in a state in which the printer 102 is activated as a Wi-Fi Direct GO in advance is similarly applicable.

In this case, when connecting, to the AP 101, the printer 102 as an STA in the infrastructure mode, in a state in which the printer 102 serves as a GO to establish the wireless network 105 in which the SR processing is enabled, information indicating whether the SR processing is enabled in the wireless network 104 is obtained. If the wireless networks 105 and 104 use the same wireless channel and the SR processing is enabled in the wireless network 104, processing of disabling the SR processing in the wireless network 105 is performed. The change processing of disabling the SR processing can be implemented by applying the change processing described above with reference to FIG. 8 (S806). Note that if the wireless networks 104 and 105 operate using different wireless channels, the active GO may temporarily be stopped, and the wireless network 105 may be established using the same wireless channel as that of the wireless network 104, thereby applying the above-described processing.

The processing when enabling the SR processing in step S904 described above has been explained. The printer 102 may determine whether it currently performs data communication with the smartphone 103 as the counter client of the GO. If data communication is currently performed, the processing of enabling the SR processing may be performed after completion of the data communication.

Furthermore, before the determination processing in step S806 described above, another determination processing may be performed. For example, the distance between the AP 101 and the printer 102 may be measured and it may be determined whether the distance satisfies a predetermined condition. Alternatively, the signal strength received from the wireless network 104 of the AP 101 may be measured and it may be determined whether the received signal strength satisfies a predetermined condition. The distance can be measured by performing transmission/reception using predetermined wireless frames.

The predetermined condition is, for example, that the distance between the AP 101 and the printer 102 is longer than a predetermined distance or that the received signal strength is smaller than a threshold. If the condition is satisfied, it is considered that the probability of collision or interference between a signal transmitted/received in the wireless network 105 and that transmitted/received in the wireless network 104 is low. Therefore, if the condition is satisfied, the printer 102 may determine to enable the SR processing in the wireless network 105. In this case, it is possible to effectively use the SR processing between the wireless networks 104 and 105.

In this embodiment, it is determined in step S806 not to use the SR processing. However, it may be determined to disable the BSS color in the wireless network 105 of the GO. As a method of disabling the BSS color in the wireless network 105, the value of the BSS_Color_Disabled subfield 711 included in an HE_Operation element 700 is used. More specifically, in a state in which the value of the BSS_Color_Disabled subfield is validated (set to 1), the HE_Operation element is added to a predetermined wireless frame to be transmitted from the GO, and then the wireless frame is transmitted. The client apparatus determines, by receiving the wireless frame, that the BSS color is disabled in the wireless network 105, and the SR processing based on the BSS color is not performed. This can reduce the occurrence of signal collision between the wireless networks 104 and 105.

In this embodiment, it is determined in step S806 not to use the SR processing. However, it may be determined to establish a legacy wireless network (non-802.11ax) by the wireless network on the GO side. In this case, it is determined in step S805 to establish the wireless network on the GO side by an 802.11ax wireless network. This can reduce the occurrence of signal collision between the concurrently operating wireless networks without controlling enabling/disabling of the SR processing.

This embodiment has explained a case in which when performing a concurrent operation, the SR processing is disallowed in the wireless network on the GO side. However, the SR processing need not be used on the STA side in the infrastructure mode. In this case, the SR processing is used in the wireless network on the GO side. As a method for not using the SR processing on the STA side, the value of the Spatial_Reuse field included in the above-described HE-SIG-A field or the like may be used. A wireless frame including a PHY header in which the parameter value of the SRP_DISALLOW or SPR_AND_NON_SRG_OBSS_PD_PROHIBITED field is set as the value of the Spatial_Reuse field may be transmitted to the wireless network 104 on the STA side. This makes the SR processing unusable while the STA transmits the wireless frame, and it is thus possible to reduce signal collision between the wireless networks on the STA side and the GO side.

Furthermore, if it is detected that the SR processing becomes unusable in the wireless network 104 to which the apparatus is connected as an STA during the concurrent operation, control may be performed to enable the SR processing in the wireless network 105 on the GO side. This can dynamically switch enabling/disabling of the SR processing in the wireless network 105.

The GO may determine whether the client apparatus disables the SR processing or complies with 802.11ax. If the client apparatus disables the SR processing or does not comply with 802.11ax, it is determined to use the SR processing in the wireless network 105 of the GO. This can efficiently use wireless media between the wireless network 105 of the GO and another peripheral wireless network.

When performing a concurrent operation, the SR processing need not be used in both the wireless network 104 on the STA side and the wireless network 105 operated by the GO. In this case, the SR processing cannot be used but communication by the concurrent operation is possible without performing complicated control associated with the SR processing.

(Modification)

Each of the above-described embodiments has explained a case in which the wireless channel of the wireless network established by the apparatus as a GO is the same as that of the wireless network of the AP to which the apparatus is currently connected as an STA. If each wireless network is established by a different channel, the SR processing may be enabled in both the wireless networks. For example, there is a case in which one RF circuit and one antenna are time-divisionally used between concurrently operating wireless networks. Similarly, there is a case in which a communication apparatus formed by two or more RF circuits or antennas can use a different RF circuit or antenna for each wireless network. If networks can operate using different channels, data collision between the networks along with the concurrent operation of the communication apparatus is difficult to occur, and it is thus possible to efficiently use the SR processing in each network.

A case in which the printer serves as a Wi-Fi Direct GO to establish the wireless network has been described but the present invention is not limited to this. For example, the present invention is applicable to a case in which the printer operates in a simple AP mode (µAP or the like). In this case, the processing that uses a wireless frame unique to Wi-Fi Direct in each of the above-described embodiments is implemented by replacing the wireless frame by another wireless frame. Alternatively, the processing may be implemented by extending the wireless frame. Furthermore, the present invention may be applied to a case in which the printer operates in an ad-hoc mode.

The printer 102 may make a notification that the SR processing is not used in the wireless network established by itself as a GO in the GO negotiation processing. This notification may be made by extending an existing wireless frame. The present invention is not limited to this, and the printer 102 may notify a counter communication apparatus using another wireless frame. The printer 102 can notify, in advance, the counter apparatus that the SR processing is not used in the process of connection processing, thereby improving the processing efficiency.

Similarly, each of the above-described embodiments has explained the form in which the printer operates as an STA in the infrastructure mode to be connected to the AP. However, the printer may operate in the ad-hoc mode instead of the infrastructure mode. Alternatively, the present invention is applicable to a case in which the printer operates as a Wi-Fi Direct client to be connected to another GO apparatus.

Each of the above-described embodiments has explained the wireless LAN communication form complying with the IEEE802.11 series but the present invention is not limited to this. For example, the present invention may be applied to a predetermined frame using a wireless communication medium such as a wireless USB, MBOA, Bluetooth®, UWB, ZigBee, or NFC. Note that MBOA is an abbreviation for Multi Band OFDM Alliance. Furthermore, UWB includes a wireless USB, wireless 1394, and WINET.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus operable in both a base station mode of establishing a wireless network and accepting connection from another apparatus and a terminal mode of performing connection to a wireless network established by another apparatus, comprising:
    at least one memory that stores a set of instructions; and
    at least one processor that executes the instructions, the instructions, when executed, causing the communication apparatus to perform operations comprising:
       controlling, in the terminal mode, to connect to a first wireless network established by another communication apparatus;
       controlling, in the base station mode, to establish a second wireless network; and
       controlling so that spatial reuse communication is disabled in the second wireless network established by the base station mode in a case where the terminal mode and the base station mode are operated concurrently in the communication apparatus.

2. The communication apparatus according to claim 1, wherein a wireless channel of the second wireless network is the same as a wireless channel of the first wireless network.

3. The communication apparatus according to claim 1, the operations further comprises controlling to transmit a wireless frame including first information indicating availability of the spatial reuse communication in the second wireless network.

4. The communication apparatus according to claim 3, wherein
the first information is included in an HE-SIG-A field of an HE_SU_PPDU frame.

5. The communication apparatus according to claim 1, wherein the spatial reuse communication is communication using an SR (Spatial Reuse) function.

6. The communication apparatus according to claim 1, wherein the spatial reuse communication is disabled by disabling communication control using a Basic Service Set (BSS) color.

7. The communication apparatus according to claim 1, the operations further comprises controlling so that spatial reuse communication can be used in the second wireless network established by the base station mode in a case where the communication apparatus is not operated in the terminal mode.

8. The communication apparatus according to claim 1, wherein the terminal mode and the base station mode are operated in a time-divisional manner in a case where the terminal mode and the base station mode are operated concurrently in the communication apparatus.

9. The communication apparatus according to claim 1, the operations further comprises controlling to transmit a wireless frame indicating that the spatial reuse communication is not allowed in the second wireless network.

10. The communication apparatus according to claim 1, wherein
the base station mode is a mode of operating as a group owner (GO) in Wi-Fi Direct, and
the terminal mode is a mode of operating as a station (STA) in an infrastructure mode.

11. A control method for a communication apparatus operable in both a base station mode of establishing a wireless network and accepting connection from another apparatus and a terminal mode of performing connection to a wireless network established by another apparatus, comprising:
controlling, in the terminal mode, to connect to a first wireless network established by another communication apparatus;
controlling, in the base station mode, to establish a second wireless network; and
controlling so that spatial reuse communication is disabled in the second wireless network established by the base station mode in a case where the terminal mode and the base station mode are operated concurrently in the communication apparatus.

12. A non-transitory computer-readable recording medium storing a program for causing a computer connected to a wireless communication unit to function as a communication apparatus operable in both a base station mode of establishing a wireless network and accepting connection from another apparatus and a terminal mode of performing connection to a wireless network established by another apparatus, comprising:
at least one memory that stores a set of instructions; and
at least one processor that executes the instructions, the instructions, when executed, causing the communication apparatus to perform operations comprising:
controlling, in the terminal mode, to connect to a first wireless network established by another communication apparatus;
controlling, in the base station mode, to establish a second wireless network; and
controlling so that spatial reuse communication is disabled in the second wireless network established by the base station mode in a case where the terminal mode and the base station mode are operated concurrently in the communication apparatus.

* * * * *